United States Patent [19]

Kerr

[11] Patent Number: 5,214,445
[45] Date of Patent: May 25, 1993

[54] MULTIPLE LASER DIODE MOUNT ASSEMBLY WITH A WRITE HEAD

[75] Inventor: Roger S. Kerr, Rochester, N.Y.

[73] Assignee: Eastman Kodak Company, Rochester, N.Y.

[21] Appl. No.: 762,830

[22] Filed: Sep. 19, 1991

[51] Int. Cl.⁵ .......................................... G01D 15/10
[52] U.S. Cl. .................................. 346/76 L; 346/108
[58] Field of Search ................ 346/76 L, 107 R, 108, 346/139 R; 385/135, 92

[56] References Cited

U.S. PATENT DOCUMENTS

| | | | |
|---|---|---|---|
| 4,801,950 | 1/1989 | Frehling | 346/76 L X |
| 4,975,717 | 12/1990 | Takemoto et al. | 346/108 |
| 5,146,241 | 9/1992 | Ferschl | 346/108 |
| 5,146,242 | 9/1992 | Zielinski | 346/108 |

Primary Examiner—A. T. Grimley
Assistant Examiner—Nestor R. Ramirez
Attorney, Agent, or Firm—Robert L. Randall

[57] ABSTRACT

An imaging system comprising a source of light movable with respect to a writing element to generate an image. A multiple laser diode and optical fiber assembly includes a pair of chambers for holding a plurality of diode assemblies. A channel-shaped member is disposed lengthwise between the two chambers. The channel member is provided with a plurality of connectors for connection with mating connectors at the end of the fibers in each of the diode mounts. The laser diode and optical fiber mounts can be readily assembled and serviced and yet provide the requisite safety against unwanted exposure to damaging light.

9 Claims, 5 Drawing Sheets

MULTIPLE LASER DIODE MOUNT ASSEMBLY WITH A WRITE HEAD

RELATED APPLICATIONS

The present application is related to commonly assigned co-pending applications U.S. Ser. No. 07/749,228, entitled LASER THERMAL PRINTER APPARATUS, filed on Aug. 23, 1991, in the names of Raymond J. Harshbarger, William G. Fahey and Ronald R. Firth, U.S. Ser. No. 749,386, entitled OPTICAL FIBER MOUNT AND SUPPORT, filed on Aug. 23, 1991, in the names of Roger S. Kerr and Stanley J. Thomas, and the copending applications noted therein.

BACKGROUND OF THE INVENTION

1. Field of the Invention

The present invention relates to a color proofing apparatus which utilizes an electronic signal input, and more particularly, to a method and apparatus for automatically producing full-color proof images using lasers to provide thermal energy to a series of color dye-donors to selectively transfer each dye in registration to a receiver to form a proof image.

2. Description of the Prior Art

Color-proofing is the procedure used by the printing industry for creating representative images that replicate the appearance of printed images without the cost and time required to actually set up a high-speed, high-volume printing press to printed an example of the images intended. In the past, these representative images, or proofs, have been generated from the same color-separations used to produce the individual color printing plates used in printing presses so that variations in the resulting images can be minimized. Various color-proofing systems have been devised to create the proofs and have included the use of smaller, slower presses as well as means other than presses, such as photographic, electrophotographic, and non-photographic processes.

The proofs generated are judged for composition, screening, resolution, color, editing, and other visual content. The closer the proof replicates the final image produced on the printing press, as well as the consistency from image to image, from press to press, and from shop to shop, the better the acceptance of the proofing system by the printing industry. Other considerations used in judging proofing systems include reproducibility, cost of the system as well as cost of the individual proofs, speed, and freedom from environmental problems. Further, since nearly all printing presses utilize the half-tone process for forming pictorial images, wherein the original image is screened, i.e. photographed through a screen to produce one or more printing plates containing an image formed of a plurality of fine dots that simulate the varying density of the original image, proofing processes that employ the half-tone process to form the proof image have been better accepted by the printing industry than have continuous tone systems.

With the advent of electronic systems for the generation of printing plates from electronic data stored in appropriate data storage devices in the form of electronically separated single color separations, the use of photographic color separations for generating proof images has become somewhat archaic, and a variety of processes have been developed and implemented to electronically form, store, and manipulate images both for generating the actual printing plates as well as for generating the proof images. While some of these electronic systems can handle and produce analog images, the most widely used systems employ digital processes because of the ease of manipulation of such digital images. In each of these electronic processes it is possible to display the resulting image on a CRT display, but it is generally necessary to produce a "hard copy" (i.e. an image actually formed on a sheet of paper or other material) before it can be fully assessed for approval of the final printing operation. Thus, each of these electronic systems requires the use of some form of output device or printer which can produce a hard copy of the image for actual evaluation. It is to the field of proofing output devices that the present invention is directed.

While purely photographic processes can provide accurate reproductions of images, they do not always replicate the reproduction resulting from printing presses. Further, most photographic processes do not produce half-tone images that can be directly compared to the printed images they are intended to emulate. Moreover, they are almost universally incapable of reproducing the images on the wide variety of paper or other material that can be run through a printing press. It is known that the appearance of the final printed image is affected by the characteristics of the paper or other material upon which it is printed. Thus, the ability to form the proof image on the material actually to be used in the press can be a determining factor in the market success of the proofing system.

Other continuous tone proofing systems, such as thermal processes and ink-jet systems have been developed, but they do not replicate the half-tone images so desired by the printing industry.

Electrophotographic proofing systems with half-tone capability have been introduced which employ either wet or dry processes. The electrophotographic systems that use dry processes suffer from the lack of high resolution necessary for better quality proofing, particularly when the images are of almost continuous tone quality. This results from the fact that dry electrophotographic processes do not employ toner particles which have a sufficiently small size to provide the requisite high image resolution. While wet electrophotographic processes do employ toners with the requisite small particle size, they have other disadvantages such as the use of solvents that are environmentally undesirable.

In commonly assigned U.S. patent application Ser. Nos. 451,655 and 451,656, both filed Dec. 18, 1989, a thermal printer is disclosed which may be adapted for use as a direct digital color proofer with half-tone capabilities. This printer is arranged to form an image on a thermal print medium, or writing element, in which a donor element transfers a dye to a receiver element upon receipt of a sufficient amount of thermal energy. This printer includes a plurality of diode lasers which can be individually modulated to supply energy to selected areas of the medium in accordance with an information signal. The print-head of the printer includes one end of a fiber optic array having a plurality of optical fibers coupled to the diode lasers. The thermal print medium is supported on a rotatable drum, and the print-head with the fiber optic array is movable relative to the drum. The dye is transferred the receiver element as the radiation, transferred from the diode lasers to the donor element by the optical fibers, is converted to thermal energy in the donor element.

A direct digital color proofer utilizing a thermal printer such as that just described must be capable of consistently and accurately writing minipixels at a rate of 1800 dots per inch (dpi) and higher to generate halftone proofs having a resolution of 150 lines per inch and above, as is necessary to adequately proof high quality graphic arts images such as those found in high quality magazines and advertisements. Moreover, it is necessary to hold each dot or minipixel to a density tolerance of better than 0.1 density unit from that prescribed in order to avoid visible differences between the original and the proof. This density control must be repeatable from image-to-image and from machine-to-machine. Moreover, this density control must also be maintained in each of the colors being employed in multiple passes through the proofer to generate a full color image.

Aspects of the apparatus which affect the density of the dots that make up the image include such things as variations and randomness of the intensity and frequency of the laser output, and variations in the output of the fiber optics which can vary from fiber to fiber and even within a single fiber as it is moved during the writing process. Variations in the finish of the drum surface as well as drum runout and drum bearing runout and variations in the parallelism of the translation of the print-head with respect to the axis of the drum also affect the density of the image dots. Any uneven movement of the imaging drum or of the writehead translation during the writing process, or anything which imparts jitter to any part of the imaging apparatus can adversely impact the quality of the finished image and its value as a representative proof. The difference in the distance between the ends of individual fibers and the drum surface also affects image density because of the fact that the end of the fiber bundle is flat while the surface of the drum is curved. Temperature variations in the print-head due to the ambient temperature of the machine as well as the fact that the writing process itself heats the print-head also influence the image density.

Variations in the print medium elements, such as variations in the thickness of the donor and receiver elements as well as the various layers that are a part thereof, can also affect the image density as it is being written.

Thus, it has been found necessary to provide a writing apparatus which meets all of the foregoing requirements and which provides means for providing a plurality of beams of coherent light which generate the desired image. The light providing means must be easily and economically assembled to provide the necessary operating stability to the light generating means while providing the necessary protection to the operating personnel against the adverse effects of stray light. Moreover, the apparatus must be readily serviceable to repair or replace the laser diodes used to generate the light or the optical fibers used to transfer the light to the writing head.

Thus it will be seen that a method and apparatus for constantly, quickly and accurately assembling the light generating laser diodes and the optical fibers used therewith will be technologically desirable and economically advantageous.

SUMMARY OF THE INVENTION

Accordingly, the present invention provides a multiple laser diode and optical fiber assembly comprising means forming an enclosure having means for mounting a plurality of diode assemblies therein. The enclosure includes an opening through which the diode assemblies can be introduced and withdrawn, with each of the diode assemblies including an optical fiber connector connected to one end of an optical fiber which is connected at the opposite end to the laser diode. An optical output comprises a plurality of optical fibers arranged as a bundle along at least a portion of their length and formed into an output array at one end of the fibers. The opposite end of the output fibers are each individually connected to individual optical fiber connectors. A removable closure member is arranged to cover at least a portion of the enclosure opening and has a plurality of optical fiber connector members extending therethrough in spaced relationship. Each of the closure connector members is disposed in close proximity with a diode assembly when the closure member is disposed over the enclosure opening whereby the optical fiber connectors of the diode assemblies can each be connected to one side of the closure connector members and the output bundle fiber connectors can each be connected to the opposite side of the closure connector members.

According to another embodiment of the present invention, a multiple laser diode and optical fiber assembly is provided comprising an enclosure having means for mounting a plurality of diode assemblies therein. The enclosure comprises a pair of elongated chambers disposed in spaced parallel relationship, with each of said chambers having means for mounting a plurality of laser diode assemblies in parallel spaced relationship transversely along the length of the chamber. Each of the chambers include an opening through which the diode assemblies can be introduced and withdrawn. Each of the diode assemblies include an optical fiber connector connected to one end of an optical fiber which is connected at the opposite end to the laser diode. An optical output comprisesa plurality of optical fibers arranged as a bundle along at least a portion of their length and formed into an output array at one end of the fibers. The opposite end of the output fibers are each individually connected to individual optical fiber connectors. A removable closure member is disposed over the space between the chambers and carries the optical output. The closure member has a plurality of optical fiber connector members extending therethrough in spaced relationship with a portion of the connectors facing each of the chambers. Each of the closure connector members are disposed in close spaced proximity with a diode assembly when the closure member is disposed in its operating position whereby the optical fiber connectors of the diode assemblies can each be connected to one side of the closure connector members and the output bundle fiber connectors can each be connected to the opposite side of the closure connector members.

Various means for practicing the invention and other features and advantages thereof will be apparent from the following detailed description of illustrative, preferred embodiments of the invention, reference being made to the accompanying drawings.

DESCRIPTION OF THE PREFERRED EMBODIMENT

Figure 1:
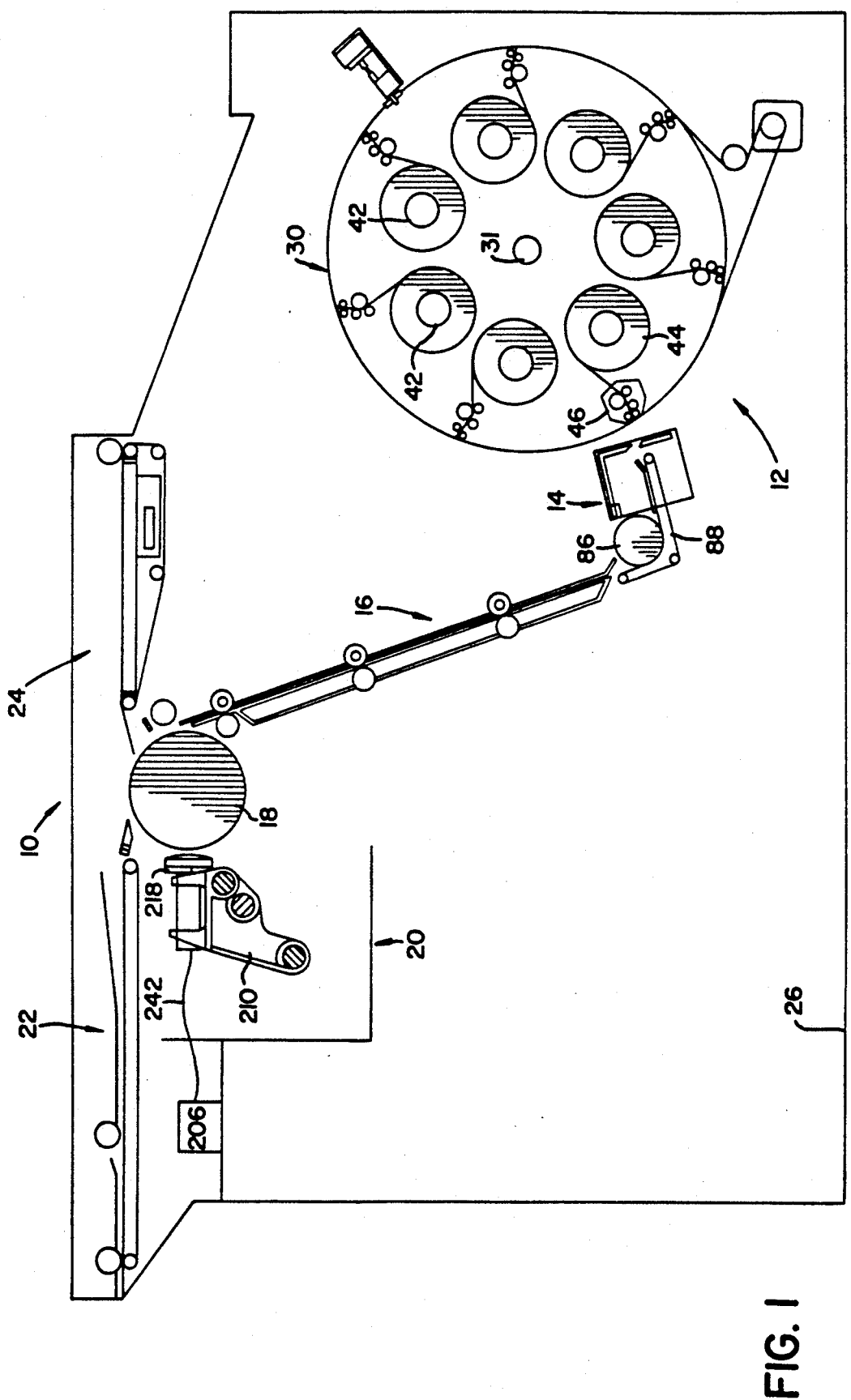
FIG. 1 is a side elevation schematic view of a proofing printer embodying the present invention.

The overall laser thermal printer proofer 10 of the present invention is illustrated generally schematically in FIG. 1 and comprises a material supply assembly 12, a sheet cutter assembly 14, a sheet transport assembly 16, an imaging drum 18, a writehead assembly 20, a waste transport 22, and an image exit transport 24. The arrangement of the components within the enclosure or cabinet 26 is such that the imaging drum 18 and the writehead assembly 20 are disposed in the upper central region of the cabinet. The material supply assembly 12 is disposed in the lower portion at one end of the cabinet, with the sheet cutter assembly 14 disposed adjacent the material supply assembly, again in the lower portion of the cabinet. The sheet transport assembly 16 extends from the sheet cutter assembly 14 to adjacent the imaging drum 18, generally opposite to the writehead assembly 20.

The overall operation of the apparatus comprises removing a portion of the supply of a receiver material from the material supply assembly 12, measuring it and cutting it to length in the sheet cutter assembly 14, and then transporting the cut sheet via sheet transport assembly 16 to the imaging drum 18 about which it is wrapped, registered, and secured. A length of donor material is then removed from the material supply assembly 12, cut to length by the sheet cutter assembly 14 and transported by the sheet transport assembly 16 to the imaging drum 18. At the imaging drum the donor material is wrapped around the drum and superposed in the desired registration with the receiver material already secured thereon. After the donor material is secured to the periphery of the drum, the writehead assembly is traversed axially along the drum as the drum is rotated, and an image is imparted to the receiver sheet. After the image has been written on the receiver sheet, the donor sheet is removed from the imaging drum, without disturbing the receiver sheet, and transported out of the apparatus via waste exit transport 22. Additional donor sheets are sequentially superposed with the receiver sheet on the drum and are imaged onto the receiver until the desired image is obtained and the completed image is exited from the apparatus via the image exit transport 24. A more detailed description of the apparatus and the operation thereof will be found in the above-referenced copending applications.

The material supply assembly 12 comprises a carousel assembly 30 mounted for rotation about a horizontal axis 31 and has a plurality of material supporting spindles 42 each arranged to carry a roll supply of material 44 for use on the imaging drum 18. The carousel 30 is rotated about its axis to bring a selected roll supply of material into opposition with the sheet cutter assembly 14 where the material is removed from the roll supply, is fed through the cutter assembly 14, is measured, and is then cut.

The sheet cutter assembly 14 is disposed adjacent the material supply carousel 30 at the material feed location and is arranged to receive the end of the web material as it is fed from the supply roll by the material feed assembly 46. The sheet cutter assembly employs a mating pair of cutter blades through which the web material is moved by the material feed assembly 46. After a sheet has been cut from the end of the roll of material, it is discharged from a metering drum 86 and belt 88, generally upwardly into a vertical sheet transport assembly 16. The sheet transport assembly delivers the cut sheet into close proximity with the imaging drum 18 where it is attached to the outer surface thereof. The imaging drum is mounted for rotation about its axis in a frame member, not shown. The donor element and the receiver element are superposed in intimate contact and are held onto the peripheral surface of the drum member by means such as by vacuum applied to the superposed elements from the drum interior. A thermal print medium for use with the printer proofer 10 of the present invention can be, for example, the medium disclosed in U.S. Pat. No. 4,772,582, which includes a donor sheet having a material which strongly absorbs at the wavelength of the exposing light source. When the donor element is irradiated, this absorbing material converts light energy to thermal energy and transfers the heat to the dye in the immediate vicinity, thereby heating the dye to its vaporization temperature for transfer to the receiver element. The absorbing material may be present in a layer beneath the dye, or it may be admixed with the dye and is strongly absorptive to light having wavelengths in the range of 800 nm-880 nm. An example of a preferred embodiment of a receiver element that can be used with the present invention is disclosed in co-pending, commonly assigned U.S. patent application Ser. No. 606,404, entitled Intermediate Receiver Opaque Support, and filed Oct. 31, 1990. The receiver element disclosed therein incorporates a reflective layer which improves the efficiency of the dye transfer to the receiver element.

An imaging light source is movable with respect to the imaging drum and is arranged to direct a beam of actinic light to the donor element. Preferably the light source comprises a plurality of laser diodes which can be individually modulated by electronic signals which are representative of the shape and color of the original image, so that each dye is heated to cause volatilization only in those areas in which its presence is required on the receiver to reconstruct the color of the original object. In the preferred embodiment, the laser diodes 206 are mounted remotely from the drum member 18, in a laser diode assembly 205 on a stationary portion of the frame member, and each direct the light produced thereby to the input end of a respective optical fiber 208 which extends to and transfers the light to the movable writing head assembly 20 adjacent the drum member. The laser diodes are selected to produce a first beam of light having wavelengths in the range of 800 nm-880 nm, and preferably predominately at a wavelength of 830 nm.

The writehead assembly 20 is moveably supported adjacent the imaging drum 18 and comprises a writing head 218 which is mounted on a moving translator member 210. The writing head contains a linear array of optical fibers which include a fiber-supporting wafer or substrate having a plurality of optical fibers mounted thereon, and as disclosed in the above-identified copending applications, have a writing end facing the drum member 18. The optical fibers extend as a bundle of fibers 242 from the opposite end of the printhead assembly to the diode laser assembly 205. The individual fibers 208 are each connected to the respective, remotely mounted diode lasers 206 which can be individually modulated to selectively project light from the writing end of the optical fibers through a lens assembly, onto the thermal print medium carried by the imaging drum 18. The fiber optic array may be of the type shown The array may be of the type shown in co-pending, commonly assigned U.S. application Ser. No. 451,656, filed Dec. 18, 1989.

Figure 2:
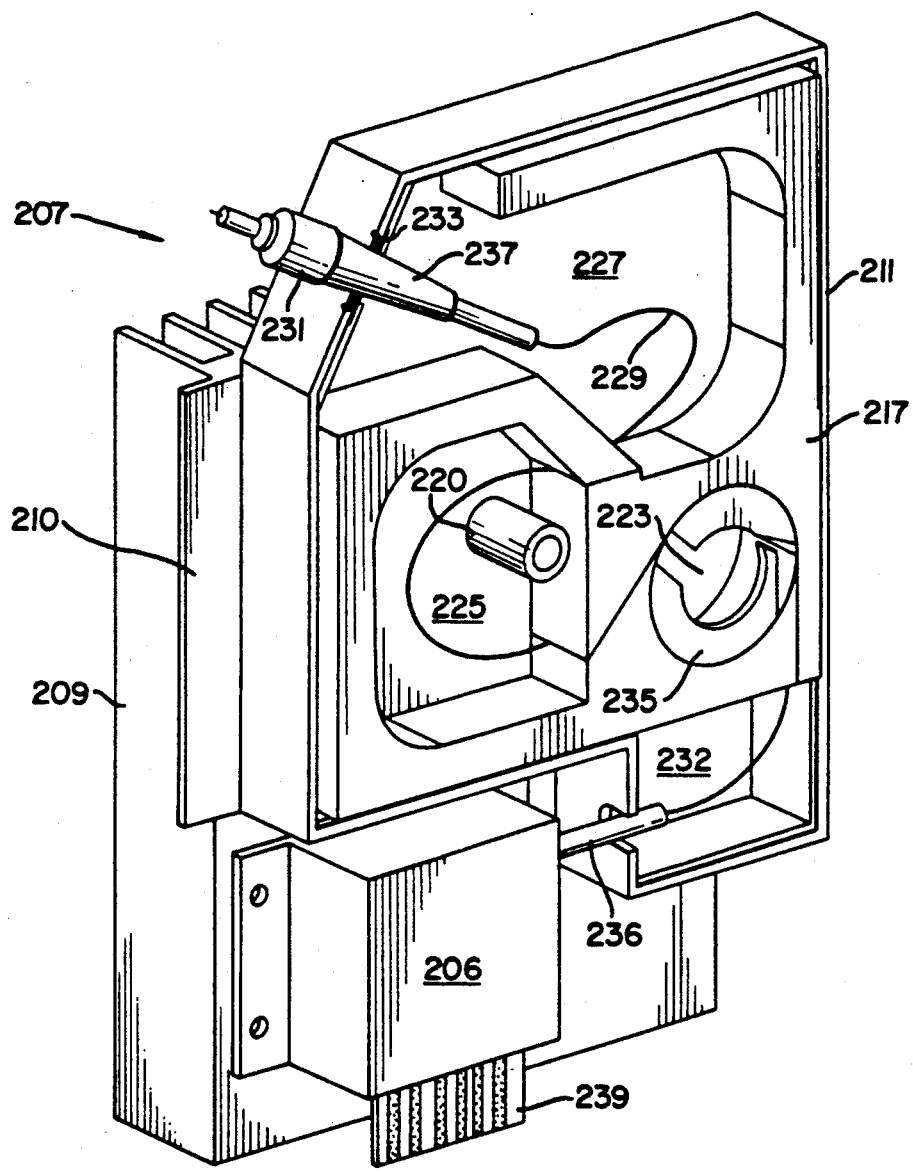
FIG. 2 is a perspective view of an improved laser mount and fiber guide.

The diode lasers 206 are individually disposed in an improved version of the diode and fiber mount disclosed in commonly assigned copending U.S. application Ser. No. 749,386. The improved diode and fiber mount 207 is illustrated in FIG. 2 and includes a heat sink 209 onto which the diode laser 206 is attached. The mount also includes a pair of oppositely disposed support and alignment ribs 210 and 212 disposed on opposite sides of the heat sink. The ribs are parallel with each other and may be in a common plane. An optical fiber guide and mode mixer 217 is also mounted in an enclosure 211 on the heat sink 209 and is provided with a cover plate 219 (See FIG. 3) which is attached to the enclosure as by a connector into a mounting post 220. The optical fiber guide and mode mixer 217 is formed of an open cell foam plastic and is provided with a cylindrical chamber 223, an outlet chamber 225, and a connector chamber 227. An optical fiber 229 is connected to the laser diode 206 and enters the fiber guide 217 through an entry chamber 232 in the enclosure 211. The fiber is wound in circular chamber 223 until substantially all the excess length thereof is accomodated and then the fiber is routed through exit chamber 225 into the connector chamber 227 where the fiber is attached to a connector 231. The connector 231 extends through an opening in the wall of the enclosure 211 where it is releasably held by a retainer 233. The circular chamber 223 is provided with a rigid cap or fiber retainer 235 which partially encloses the circumference of that chamber to prevent the fiber wouund therein from clockspringing out of the chamber during assembly. The cap is provided with a central opening and radial slots to the wall of the chamber to permit the fiber to be wound into the chamber through the open top thereof before the cover plate 219 is attached to the enclosure 211. The cap may be integrally formed with the enclosure or may be an insert applied during assembly. With this construction, a substantial length of fiber may be wound into the cylindrical chamber 223, providing mode mixing for the light passing therethrough and accomodating variations in the length of the fiber between the laser diode and the outlet connector 215. Moreover, any odd length of fiber not accomodated by a full wrap within the cylindrical chamber 223 may be accomodated by the outlet chamber 225. The entrance chamber 232 accepts the strain relief 236, which encases the fiber as it leaves the diode case 206, and ensures that the fiber is enclosed to prevent the leakage of stray light therefrom before it enters the cylindrical chamber 223. The connector chamber 227 provides space for the storage of the connector 231 and its associated strain relief tubing 237 until it is connected to the laser diode assembly, as will be further described hereinbelow, and for a length of fiber that will permit the withdrawal of the connector from the retainer 233 for attachment to a mating connector on an adjacent portion of the assembly. Accordingly, the present invention provides a compact laser diode and optical fiber mount and guide assembly wherein the fiber is guided and held relatively stationary while providing the mode mixing and cladding mode stripping necessary to even out the light transmitted thereby, and at the same time accomodating a variable length of fiber with no modifications to the fiber necessary, while providing a releasable accomodation for the fiber connector during storage and handling until it is connected to the laser diode assembly.

The laser diode 206 is provided with an edge connector 239 which is rigidly connected to the diode case and extends outwardly therefrom. Heretofore such laser diodes have been provided with electrical connections in the form of pins which require precise alignment and individual attachment to mating connectors to supply the necessary electrical connections to the laser diode assembly. Such prior art connectors for laser diode assemblies require costly and time consuming assembly in the apparatus with which they are associated. The present edge connector is so disposed as to extend outwardly from the diode casing adjacent an edge of the diode and fiber mount 207, but prferrably terminates inside the periphery of the mount to avoid unnecessary exposure to contact and possible damage during handling. The edge connector may be of the type normally used with printed circuit boards and is diposed in a plane parallel with or coplanar with the plane containing the support and alignment ribs 210 and 212. The laser diode assembly is provided with complimentary guide channels 250 mounted so as to accept the support and alignment ribs as the diode and fiber mount 207 is slid into position. A female socket 252 is also mounted in the same relationship with the guide channels 250 that the edge connector 239 has with the guide ribs 210 and 212 so that, as the mount 207 is slid along the guide channels, the edge connector 239 automatically lines up with and is inserted into the socket, completing the connection of the laser diode to its associated power and control circuitry.

Figure 3:
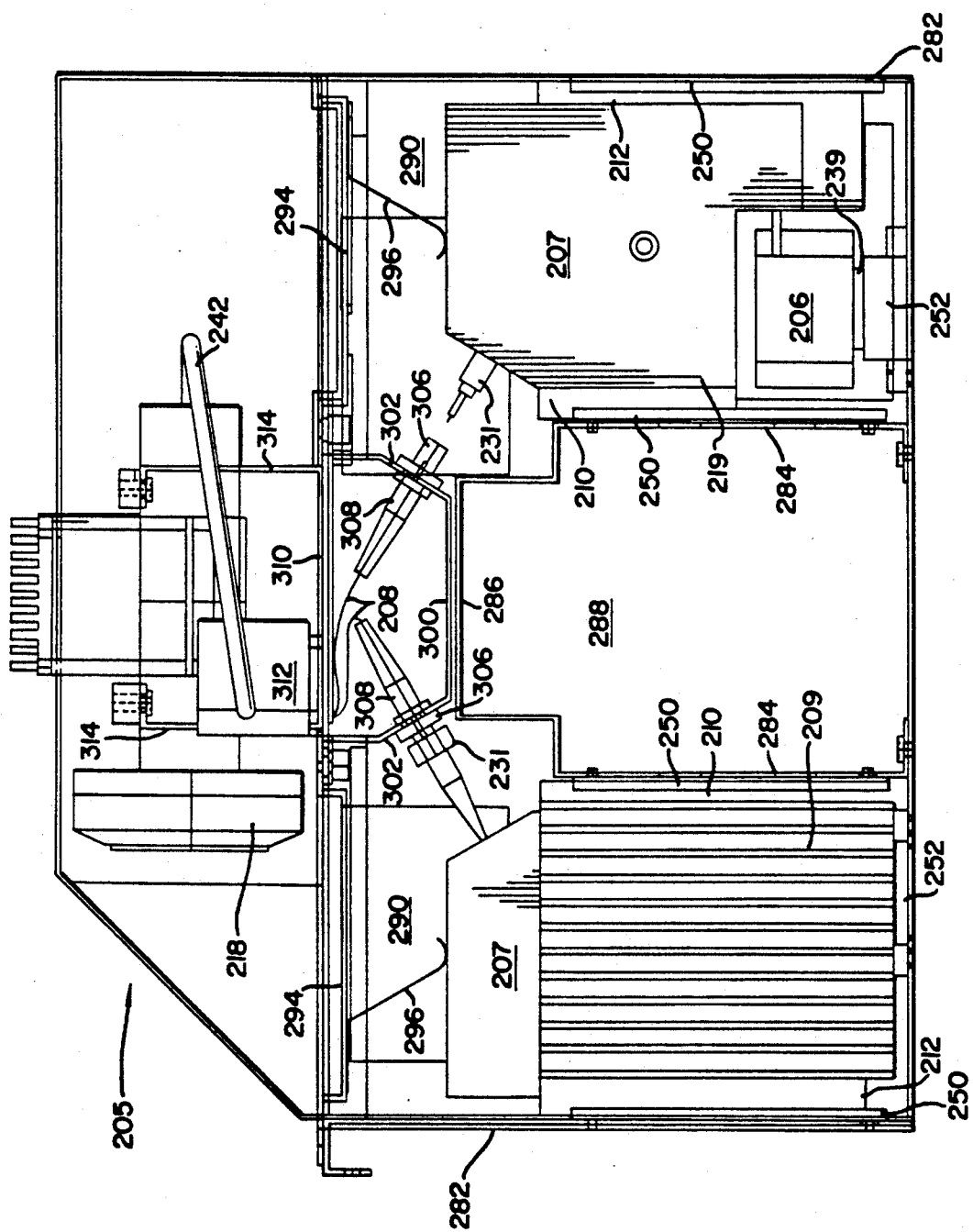
FIG. 3 is cross section of a laser diode assembly taken along line 3—3 of FIG. 4.
Figure 4:
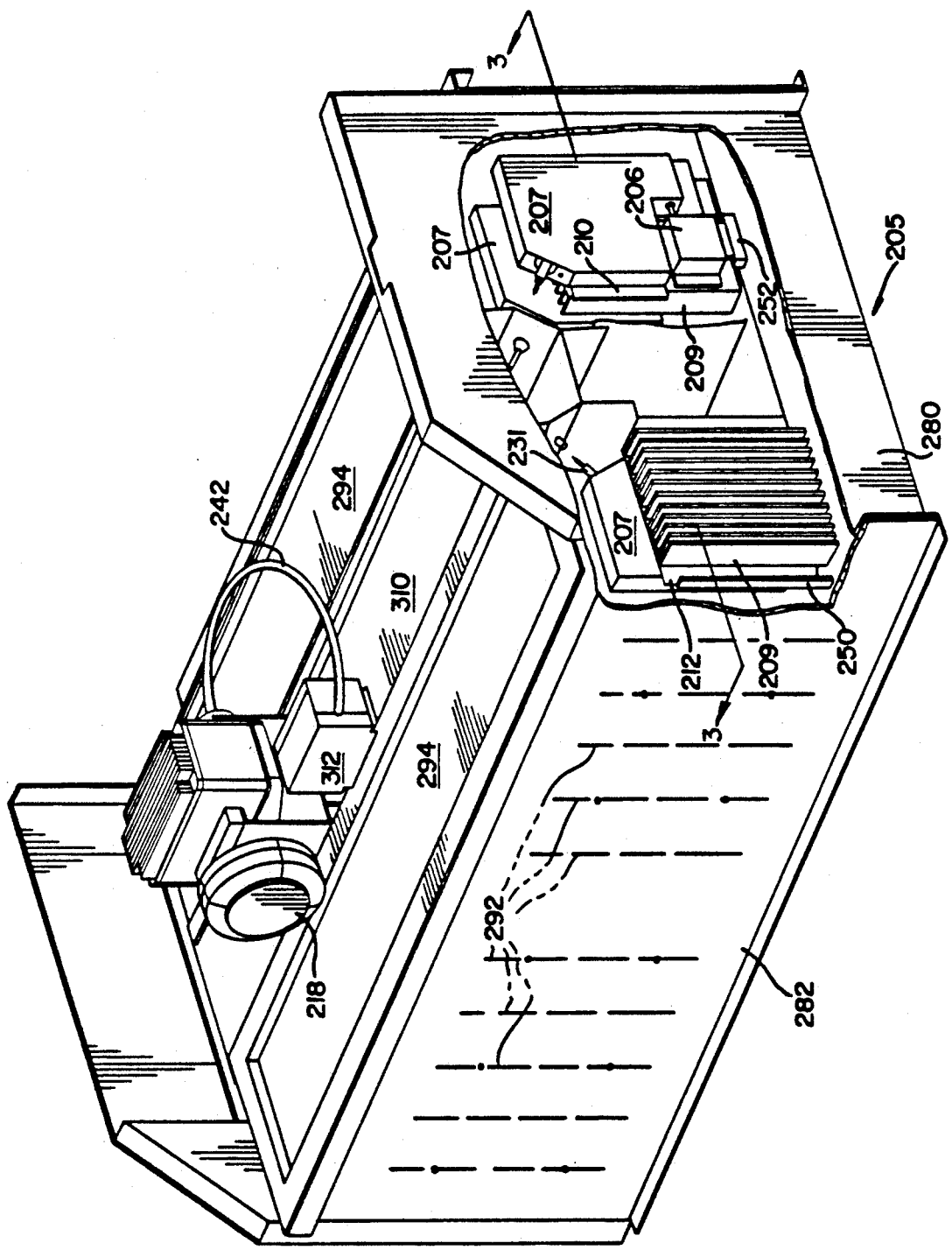
FIG. 4 is a front perspective view of a laser diode assembly, partially broken away to show a portion of the interior, with its associated writing head.
Figure 5:
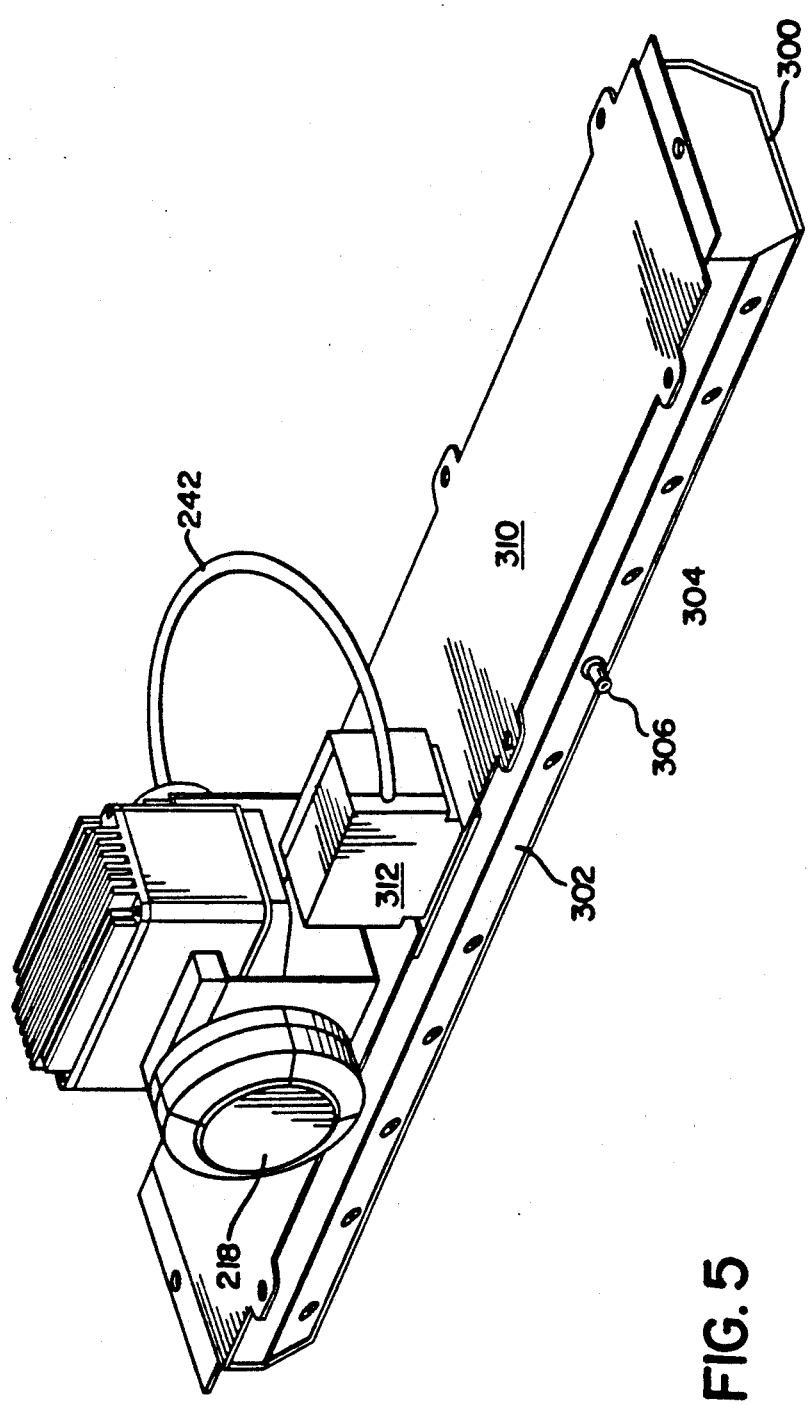
FIG. 5 is a perspective view of the writing head and its optical fiber sub-assembly.

Referring now to FIGS. 3-5, the laser diode assembly 205 comprises an enclosure formed, for example of sheet metal, having end and side walls 280 and 282, respectively. The lower portion of the enclosure is divided into three chambers extending along the length of the enclosure created by vertical interior walls 284 which are connected at the top by a horizontal closure member 286. The central chamber 288 is substantially empty while the two lateral chambers 290 are arranged to accept a plurality of laser diode mounts 207 with the associated laser diodes 206. A plurality of vertical guide channels 250 are mounted on the opposite side walls of each of the chambers 290 to accept the respective diode mounts 207 in substantially vertical spaced relationship. The general spacing and location of the laser diode and fiber mounts is indicated by the vertical phantom lines 292 (FIG. 4) which indicate that a total of eleven laser diodes may be accommodated by the front chamber 290. The rear chamber may accommodate the same or a different number of laser diodes. The top of the chambers are closed by removable closure plates 294 which are provided with spring fingers 296 associated with each of the laser diode assemblies 207 to resiliently urge the diode mounts into position when the cover plates 294 are secured in position. Each of the pairs of the guide channels 250 have associated therewith a female socket 252 located as described above with respect to the individual laser mounts. Means may be provided for directing cooling air through the chambers 290 to remove heat from the individual laser diodes.

A channel-shaped member 300 is disposed lengthwise between the two chambers 290 and above central chamber 288. The channel member 300 is provided with sidewalls having lower portions 302 which are angled with respect to the vertical and which are disposed substantially parallel with the facing portion of the laser diode and optical fiber mounts 207 disposed in chambers 290. Openings 304 (FIG. 5) are provided through the angled portions of the sidewall 302 which are generally in alignment with the connectors 231 of the laser diode mounts 207. Each of the openings are provided with a mating connector 306 for connection with the respective connectors 231 at the end of the fibers in each of the diode mounts. One of the connectors 231 is illustrated connected to connector 306 in the left-hand portion of FIG. 3. The inner ends of connectors 306 mate with connectors 308 at the ends of the fibers 208 which extend to the write head 218 through the fiber bundle 242. The top of the channel-shaped member 300 is closed by closure plate 310 which carries on the upper surface thereof a mode mixing chamber 312 and transport brackets 314 for the write head 218. The optical fibers 208 extend from their respective connectors 308 through the interior of channel member 300 into the mode mixing chamber 312 where they are coiled to provide the desired mode mixing of the light being transported thereby and are then gathered into the bundle 242 which extends from the mode mixer 312 to the end of the write head 218 which, as illustrated is mounted during shipment on the supports 314 on the top of the channel member assembly.

Accordingly, during assembly the channel member 300 is separated from the remainder of the laser diode assembly and cover plates 294 are opened from the chambers 290 to permit insertion of the respective laser diode mounts 207. A mount is inserted by aligning the guide fins 210 and 212 with the respective channel members 250 and then sliding the mount downward until the edge connector 239 mates with the respective female socket 252. Meanwhile, the channel assembly 300 has been assembled by temporarily mounting the write head 218 in the temporary mounts 314 and connecting the fiber bundle 242 to the mode mixer 312 on the cover plate 310. The optical fibers 208 from the bundle are wound a sufficient number of turns in the mode mixer to provide the mode mixing necessary and to accomodate any excess length thereof and are directed to the interior of the channel-shaped member 300 where the individual fibers, with their respective connectors 308, are connected to the inner ends of the mating connectors 306 which have been mounted through the respective holes 304 through the side wall 302 of the chamber. The assembled channel assembly is then placed on top of the enclosure of the laser diode assembly 205, and is supported over the central chamber 288. The respective connectors 306 are disposed substantially in alignment with the respective connectors 231 of each laser diode mount. These connectors 231 are then pulled from the mount and connected to the connectors 306. After the connectors for all of the diode mounts have been attached, the cover plates 294 are closed, completely enclosing all light generating and transmitting portions of the apparatus in a light-tight closure. Thereafter the write head 218 is removed from the temporary mounts 314 and is attached to the translator member 210.

Accordingly, the present arrangement provides a laser diode assembly which is modular in form permitting the assembly and disassembly of various components individually and yet providing the necessary location stability for the optical fibers. Moreover, the laser diodes are completely enclosed as are all of the associated optical fibers, thereby reducing the possibility of radiation escaping therefrom.

The invention has been described in detail with particular reference to a presently preferred embodiment, but it will be understood that variations and modifications can be effected within the spirit and scope of the invention.

I claim:

1. A multiple laser diode and optical fiber assembly comprising means forming an enclosure having means for mounting a plurality of diode assemblies therein, said enclosure including an opening through which said diode assemblies can be introduced and withdrawn, each of said diode assemblies including an optical fiber connector connected to one end of an optical fiber which is connected at the opposite end to said laser diode, an optical output comprising a plurality of optical fibers arranged as a bundle along at least a portion of their length and formed into an output array at one end of said fibers, the opposite end of said output fibers each being individually connected to individual optical fiber connectors, and a removable closure member arranged to cover at least a portion of said enclosure opening and having a plurality of optical fiber connector members extending therethrough in spaced relationship, each of said closure connector members being disposed in close proximity with a diode assembly when said closure member is disposed over said enclosure opening whereby said optical fiber connectors of said diode assemblies can each be connected to one side of said closure connector members and said output bundle fiber connectors can each be connected to the opposite side of said closure connector members.

2. The multiple laser diode and optical fiber assembly according to claim 1 wherein said diode assemblies are disposed in parallel spaced relationship along the length of said enclosure.

3. The multiple laser diode and optical fiber assembly according to claim 1 wherein a plurality of pairs of mounting members are connected to said enclosure means to hold said diode assemblies therein.

4. The multiple laser diode and optical fiber assembly according to claim 3 wherein said mounting members are channel members arranged to accept an edge of said diode assemblies.

5. A multiple laser diode and optical fiber assembly comprising means forming an enclosure having means for mounting a plurality of diode assemblies therein, said enclosure comprising a pair of elongated chambers disposed in spaced parallel relationship, each of said chambers comprising means for mounting a plurality of laser diode assemblies in parallel spaced relationship transversely along the length of said chamber, said chambers including an opening through which said diode assemblies can be introduced and withdrawn, each of said diode assemblies including an optical fiber connector connected to one end of an optical fiber which is connected at the opposite end to said laser diode, an optical output comprising a plurality of optical fibers arranged as a bundle along at least a portion of their length and formed into an output array at one end of said fibers, the opposite end of said output fibers each being individually connected to individual optical fiber connectors, and a removable closure member disposed over the space between said chambers and having a plurality of optical fiber connector members extending therethrough in spaced relationship with a portion of said connectors facing each of said chambers, each of said closure connector members being disposed in close spaced proximity with a diode assembly when said closure member is disposed in operating position whereby said optical fiber connectors of said diode assemblies can each be connected to one side of said closure connector members and said output bundle fiber connectors can each be connected to the opposite side of said closure connector members.

6. The multiple laser diode and optical fiber assembly according to claim 5 wherein said diode assembly mounting means is arranged as a plurality of pairs of channel members connected to the interior of said chambers to hold said diode assemblies therein.

7. The multiple laser diode and optical fiber assembly according to claim 5 wherein said cover member includes a mode mixing chamber for said output fibers.

8. The multiple laser diode and optical fiber assembly according to claim 5 wherein said closure member is provided with means for mounting said output means.

9. The multiple laser diode and optical fiber assembly according to claim 5 wherein chambers are provided with a plurality of female socket members mounted therein, each of said socket members arranged to mate with a corresponding connector plug on a corresponding diode assembly as the diode assembly is inserted into said chamber.

* * * * *